Dec. 30, 1947.  L. G. LAWRENCE  2,433,375
LEAD-IN CONNECTION FOR ELECTRON DISCHARGE TUBES
Filed Aug. 22, 1944
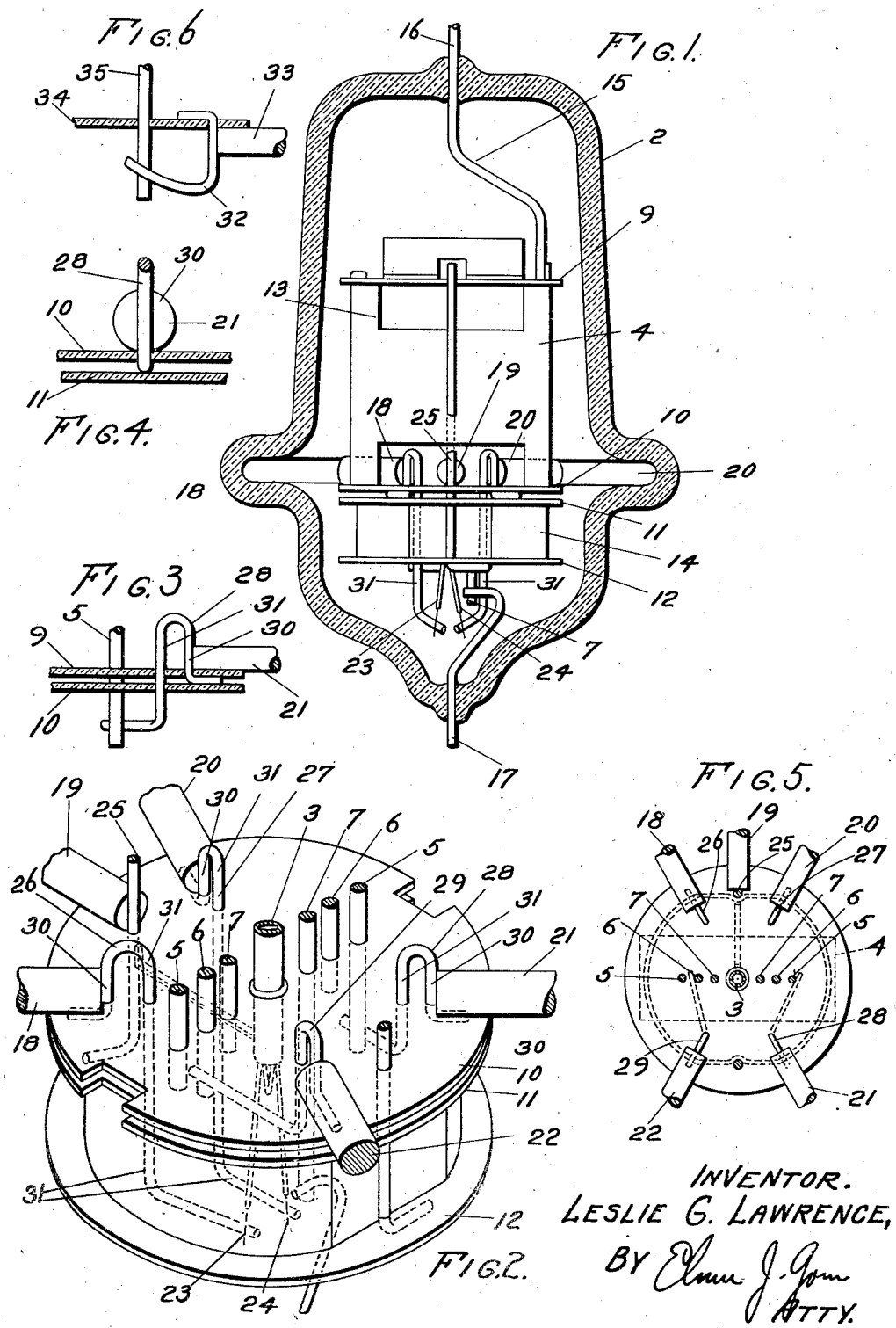
INVENTOR.
LESLIE G. LAWRENCE,
BY
ATTY.

Patented Dec. 30, 1947

2,433,375

UNITED STATES PATENT OFFICE 2,433,375

LEAD-IN CONNECTION FOR ELECTRON DISCHARGE TUBES

Leslie G. Lawrence, Newton Highlands, Mass., assignor to Raytheon Manufacturing Company, Newton, Mass., a corporation of Delaware Application August 22, 1944, Serial No. 550,614

1 Claim. (Cl. 250—27.5)

This invention relates to electron discharge tubes and more particularly to those of the acorn type.

An object of the present invention is to provide a novel welded connection of the connector-wires to the lead-in wires, whereby the welding and correct mounting of the parts is facilitated and simplified.

Another object of the invention is to insure uniformity of the connector-wire assemblies.

These objects and such other objects and aims of the present invention, as may hereinafter appear, will be readily understood from the following description taken in connection with the accompanying drawing of embodiments of the invention herein presented for illustrative purposes.

In the drawing:

Fig. 1 is a vertical section of an electron discharge tube incorporating one illustrative embodiment of the present invention;

Fig. 2 is a perspective view of the lower portion of an electrode assembly of an electron discharge tube of the acorn type and connections embodying the present invention;

Fig. 3 is a detailed drawing in perspective of the connection, in accordance with the present invention, of the connector-wire with the lead-in wire on the one hand and an element of the electrode assembly on the other hand;

Fig. 4 is a detailed drawing showing an end view of a lead-wire and connector-wire welded thereto in accordance with the present invention;

Fig. 5 is a detailed drawing of a top plan view of the lead-in wire pattern, showing the normal positions of the lead-in wires relatively to each other and to the anode or plate of the tube; and Fig. 6 shows a modification of the connector-wire connections according to the present invention.

Heretofore difficulty has been experienced in welding the connector-wires to the lead-in wires in a uniform manner. Thus, the weld has not always been made at the same spot on the lead-in wire, so that the lead-in wires of a tube have not been properly positioned in the latter relatively to each other or to the plate, thus giving rise to objectionable capacity effects or short-circuits in the tube. The connector-wire was also rather easily deformed in handling or welding, so that when a connector-wire, after being welded to a lead-in wire, was inserted in the appropriate spacing perforation in a spacing member, the lead-in wire could not be correctly clamped upon the spacing member, thus causing the latter to be tipped or displaced to the extent of injuriously affecting not only its own position, but also the positions of other elements in the tube. Even an expert operator could not consistently avoid occurrence of these objectionable results, which have been the cause of many rejects. The present invention overcomes the above difficulties and greatly simplifies the welding operation so that it no longer requires an expert operator.

In the drawing, the invention is shown incorporated in an electron discharge tube of the acorn type. Said tube comprises an envelope 2 of glass, or other suitable material, containing an electrode assembly including a cathode 3, preferably of the indirectly heated type (see Fig. 2), an anode or plate 4, and three grids 5, 6 and 7 enclosed within said plate 4. Only the upright supporting posts of said three grids are shown in order not to complicate the drawing. Said posts are mounted in suitable spacing members, four such spacing members 9, 10, 11 and 12 of mica or other suitable insulating material being herein provided. The two spacing members 10 and 11 are relatively close together, while spacing members 9 and 12 are located at the top and bottom, respectively, of the electrode assembly. A shield 13 encloses the upper part of the electrode assembly and a shield 14 encloses the lower part thereof between said two mica spacing members 11 and 12. The plate 4 is connected by a conductor 15 to a lead-in wire 16 sealed through the top of the tube. A lead-in wire 17, sealed through the bottom of the tube, is connected to the lower end of grid 7. The remaining lead-in wires 18, 19, 20, 21 and 22 are sealed through the side wall of the tube, three on one side and two on the other side. Lead-in wires 18 and 20 are connected, respectively, to heating wires 23 and 24 of the cathode 3, and lead-in wires 19, 21 and 22 are connected, respectively, to the cathode 3, grid 5 and grid 6. (See Figs. 2 and 5.) These connections are made in a novel manner and by means of a novel connector-wire in accordance with the present invention. Referring to the case of lead-in wire 19, it will be noted (see Fig. 2) that the connector-wire 25 is welded to the end surface of the lead-in wire 19, diametrically of said surface, that is to say, in a plane containing the longitudinal axis of said lead-in wire. The other end of said connector-wire will preferably be inserted through spacing perforations in one or more of said spacing members, through the spacing members 10, 11 and 12, for example, and its lower end bent up against the under surface of said spacing member 12 to clamp said lead-in wire firmly down upon the upper surface of said spacing member 10. In the case of lead-in wires 18, 20, 21 and 22, the connector-wires 26, 27, 28 and 29 are bent over at one end, for example, in the form of a U, and one shank, shank 30, for example, of the U-shaped end, is welded to the end surface of the lead-in wire, also diametrically of said surface, both shanks 30 and 31 being in the same plane, in the present instance in a plane containing the longitudinal axis of the lead-in wire. Both shanks 30 and 31, of said connector-wires, will be inserted through corresponding spacing perforations of one or more of said spacing members, the shank 30 through the spacing member 10, for example (see Fig. 2), and bent up against its lower surface to clamp the lead-in wire firmly down upon said spacing member, while the shank 31 is connected to the proper electrode element, as previously stated.

In the modification shown in Fig. 6 the weld of the connector-wire 32 to the end surface of the lead-in wire 33 is under the spacing member 34, corresponding, for example, to the spacing member 10 of Fig. 1, the upper end of said connector-wire being inserted through a spacing perforation in said spacing member and bent down upon the upper surface of the latter to clamp said lead-in wire 33 to the underside of said spacing member, the other end of said conductor wire being welded to a grid post 35 or other desired element of the electrode structure below said spacing member.

From the above description it will be seen that by welding the connector-wire to the end surface of the lead-in wire and diametrically of said surface, in accordance with the present invention, the welded connection is automatically located in the corrected position, and when the connector-wires of the various lead-in wires have been inserted through the appropriate perforations of the predetermined pattern in the spacing member, the various lead-in wires will be correctly positioned within the tube, both relatively to one another and relatively to the plate. All danger of short-circuiting between adjacent lead-in wires or between a lead-in wire or lead-in wires and the plate is excluded. Furthermore, deformation of connector-wires in handling or welding can be easily avoided, so that difficulty in clamping the lead-in wires into close contact with the spacing member is avoided. Lead-in wires are usually provided with a coating to cushion stresses due to unequal expansion of said wires and the glass of the envelope through which they are welded, and heretofore it has been necessary to remove said coating before welding a connector-wire to a lead-in wire. By welding the connector-wire to the end surface of the lead-in wire, which surface is not coated, this precaution becomes unnecessary. It will be noted that in the embodiment of the present invention using a connector-wire with a U-shaped end only one shank of the U-shaped end is welded to the end surface of the lead-in wire, so that should the spacing of the two shanks not correspond exactly to that of the two perforations through which they are to be inserted in a spacing member, the shank that has not been welded to the end surface of the lead-in wire can easily be adjusted at the right distance from the welded shank to enable both shanks to be inserted through said perforations without difficulty and without risk of forcing said shanks or fracturing said spacing member, in order correctly to position said lead-in wire upon said spacing member.

I am aware that the present invention can be embodied in other specific forms without departing from the spirit or essential attributes thereof, and I therefore desire the present description to be considered in all respects as illustrative and not restrictive, reference being had to the appended claim rather than to the aforesaid description to indicate the scope of the invention.

What is claimed is:

In an electron discharge tube, the combination of a spaced member having two spacing perforations, an electrode element, a lead-in wire, and a connector-wire for electrically connecting said lead-in wire to said electrode element, said connector-wire having a U-shaped end, one shank of said U-shaped end being welded to an end surface of said lead-in wire diametrically of said surface, the two shanks of said U-shaped end of said connector-wire being inserted through said spaced perforations, the free end of one shank being bent into contact with said spacing member to clamp said lead-in wire to the latter, the other shank being joined to said electrode element.

LESLIE G. LAWRENCE.

REFERENCES CITED

The following references are of record in the file of this patent:

UNITED STATES PATENTS

| Number | Name | Date |
|---|---|---|
| 2,017,549 | Salzberg | Oct. 15, 1935 |
| 1,965,338 | Gibson et al. | July 3, 1934 |
| 2,086,578 | Samuel | July 13, 1937 |
| 2,030,187 | Salzberg | Feb. 11, 1936 |
| 2,267,450 | Ekstrand et al. | Dec. 23, 1941 |